United States Patent

Koga

[11] Patent Number: 5,878,194
[45] Date of Patent: Mar. 2, 1999

[54] METHOD AND DEVICE FOR OUTPUTTING MULTICOLOR DOCUMENT

[75] Inventor: Hiroshi Koga, Kawasaki, Japan

[73] Assignee: Canon Kabushiki Kaisha, Tokyo, Japan

[21] Appl. No.: 441,668

[22] Filed: May 15, 1995

Related U.S. Application Data

[63] Continuation of Ser. No. 113,318, Aug. 30, 1993, abandoned, which is a continuation of Ser. No. 640,164, Jan. 11, 1991, abandoned.

[30] Foreign Application Priority Data

Jan. 19, 1990 [JP] Japan ......................................... 2-8372

[51] Int. Cl.[6] .................................................. G06T 1/00
[52] U.S. Cl. .......................... 395/109; 395/110; 395/117
[58] Field of Search .................................. 707/500, 517, 707/520, 530, 531; 345/431

[56] References Cited

U.S. PATENT DOCUMENTS

| | | | |
|---|---|---|---|
| 4,189,217 | 2/1980 | Goldstein et al. | 354/7 |
| 4,516,139 | 5/1985 | Takiguchi | 346/140 |
| 4,731,634 | 3/1988 | Stark | 355/328 |
| 4,745,560 | 5/1988 | Decker et al. | 364/519 |
| 4,789,855 | 12/1988 | Ozeki | 345/150 |
| 4,841,453 | 6/1989 | Finlay et al. | 364/519 |
| 4,843,426 | 6/1989 | Levine | 355/202 |
| 4,847,654 | 7/1989 | Honma et al. | 358/300 |
| 4,862,219 | 8/1989 | Yoshida et al. | 355/202 |
| 4,868,554 | 9/1989 | Aoki et al. | 340/735 |
| 4,998,213 | 3/1991 | Suzuki et al. | 395/112 |
| 5,020,004 | 5/1991 | Igarashi | 364/519 |
| 5,045,967 | 9/1991 | Igarashi | 364/518 |
| 5,097,426 | 3/1992 | Kawamura et al. | 395/110 |
| 5,113,251 | 5/1992 | Ichiynagi et al. | 358/500 |
| 5,113,356 | 5/1992 | Nickell et al. | 395/108 |
| 5,134,440 | 7/1992 | Nishimori | 399/184 |
| 5,168,292 | 12/1992 | Kadowaki et al. | 346/157 |
| 5,295,239 | 3/1994 | Murakami | 395/151 |
| 5,621,873 | 4/1997 | Tanaka et al. | 395/779 |

FOREIGN PATENT DOCUMENTS

| | | |
|---|---|---|
| 310712 | 4/1989 | European Pat. Off. . |
| 2266224 | 10/1975 | France . |

OTHER PUBLICATIONS

Patent Abstract of Japan, vol. 14, No. 345 (P–1083) (Kokai 2–123486) (May 1990).
Patent Abstracts of Japan, vol. 11, No. 345 (P–636) (Kokai 62–126462) (Jun. 1987).
Patent Abstracts of Japan, vol. 13, No. 415 (M–870) (Kokai 1–152087) (Jun. 1989).

*Primary Examiner*—Joseph H. Feild
*Attorney, Agent, or Firm*—Fitzpatrick, Cella, Harper & Scinto

[57] ABSTRACT

There is provided a multicolor document output device including a designating circuit to designate an output position of a character; an output format setting circuit to set an output format of character information which is output to the designated position; a color setting circuit to set an output color of the character information which is output to the designated position; an input circuit to input document information to be output; and an output controller to control so as to output the document information on the basis of the set output format and the set output color. An area is designated by the number of lines and the number of columns of a character to be output. The output color can be easily matched with the input document data.

12 Claims, 5 Drawing Sheets

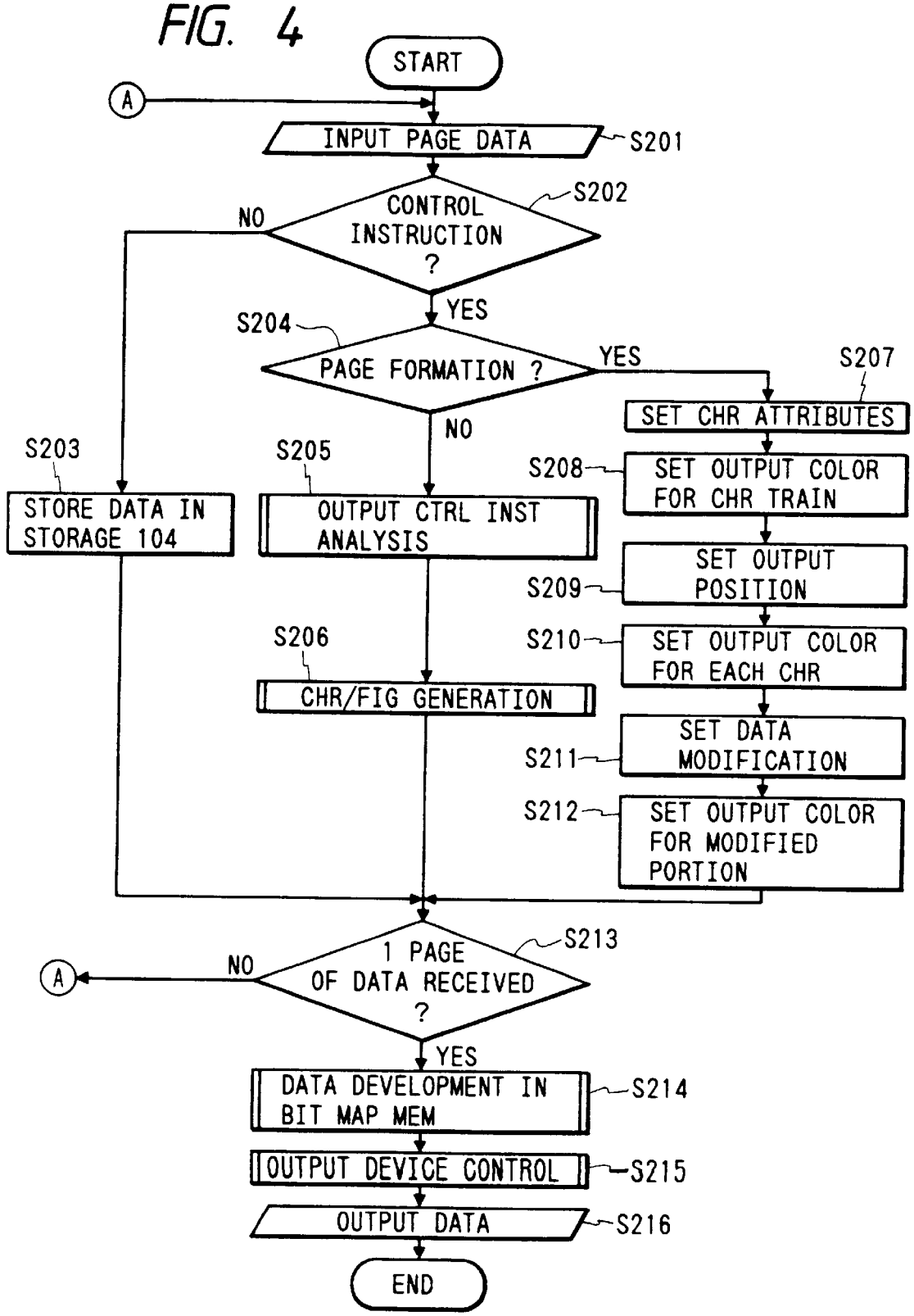

METHOD AND DEVICE FOR OUTPUTTING MULTICOLOR DOCUMENT

This application is a continuation of application Ser. No. 08/113,318 filed Aug. 30, 1993, now abandoned which is a continuation of application Ser. No. 07/640,164 filed Jan. 11, 1991, now abandoned.

BACKGROUND OF THE INVENTION

1. Field of the Invention

The present invention relates to a multicolor document output method and device for outputting characters of symbols in designated color.

2. Related Background Art

In a conventional color document output device, a single-color output operation occupies almost all of the operations of the device.

On the other hand, even in the case of outputting a document in a plurality of colors, the output color must be set with respect to an area for a recording paper.

Therefore, the above conventional technique has the following drawbacks.

(1) It is difficult to match document data which is input with an area in which an output color has been set.

(2) The output color is not set in accordance with attributes of characters in document data which is input. The output color cannot be easily set on a character unit basis in accordance with a different output magnification, pattern, or the like.

(3) The output color is not set on the basis of output positions of characters in document data which is input. The output color cannot be easily set in accordance with a special output position (line and column) and the number of characters.

(4) The output color is not set on the basis of a modification of document data which is input. The output color cannot be set for an underline portion, a rotation character, an emphasis character, or a character train.

SUMMARY OF THE INVENTION

To solve the above problems, it is an object of the invention to provide a multicolor document output device comprising: designating means for designating an output position of a character; output format setting means for setting an output format of character information which is output to the position designated by the designating means; and color setting means for setting an output color of the character information which is output to the position designated by the designating means.

It is another object of the invention to provide a multicolor document output device comprising: input means for inputting document information to be output; and output control means for controlling so as to output the document information on the basis of the information set by the foregoing output format setting means and the color setting means.

Still another object of the invention is to provide a multicolor document output device comprising ID information adding means for adding information indicating that it is information to designate an output format before the position information which is designated by the designating means.

BRIEF DESCRIPTION OF THE DRAWINGS

FIG. 4 is a flowchart showing an operation processing procedure of a CPU 113.

DESCRIPTION OF THE PREFERRED EMBODIMENT

An embodiment according to the invention will be described in detail below with reference to the drawings.

<Description of Schematic Construction (FIG. 1)>

Figure 1:
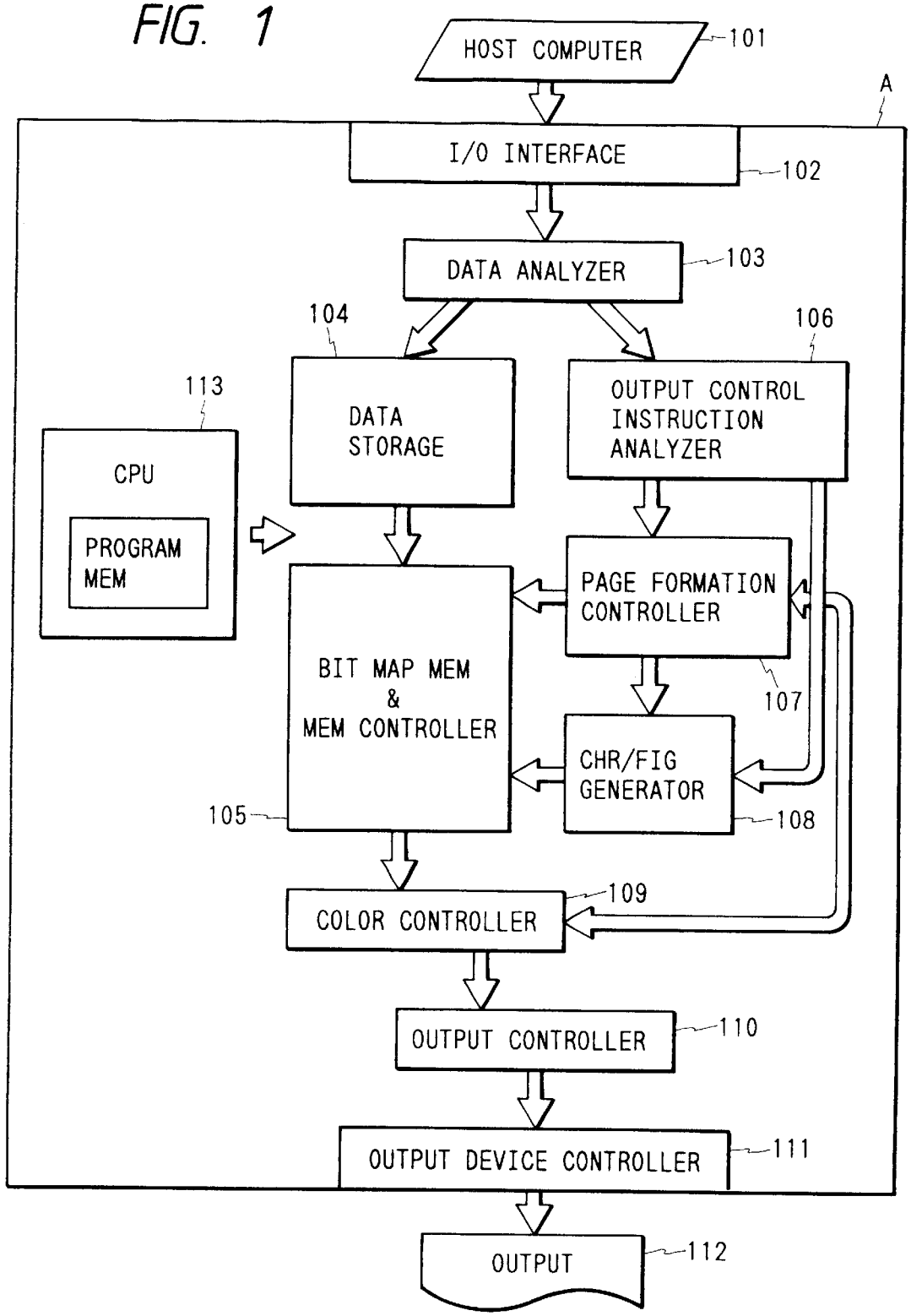
FIG. 1 is a block constructional diagram of a multicolor document output device according to an embodiment.

FIG. 1 is a block constructional diagram of a multicolor document output device according to the embodiment.

In the diagram, A denotes a multicolor document output device comprising the following component elements.

Reference numeral 102 denotes an input/output (I/O) interface for executing communication with a host computer (or external input apparatus) 101; 103 an I/O data analyzer for anlayzing document data which is input; and 104 a data storage to store a data portion (character code, image data, etc.) of the input document data.

Reference numeral 105 denotes a bit map memory and memory cotroller for developing a bit image of one page when data is actually output and for controlling the development of the data into the memory; 106 an output control instruction analyzer for analyzing an output control instruction; 107 a page formation controller to execute a page information formation operation, among output control instructions, using character attributes, output position, page data modification, and the like; 108 a character/figure generator for generating a character/figure pattern or the like; and 109 an output color controller for selecting and outputting color information in the page information which was formed by the page formation controller 107 when the bit image developed in the bit map memory 105 is output. Reference numeral 110 denotes an output controller to control a document output device controller (engine section) 111; 112 a document output which is output from the document output device controller 111; and 113 a CPU to control the whole multicolor document output device A.

<Description of Schematic Operation (FIGS. 2 and 3)>

The schematic operation of the multicolor document output device in the embodiment is described below.

The multicolor document output device in the embodiment uses what is called a mapping mode in which only the minimum control instructions are included in document data and information (page definition) to defines an output format is input before the document data. That is, information regarding the output format is first received and the document data (character, image, etc.) which is subsequently sent is processed in accordance with the output format and output. Such a mapping mode is generally suitable for outputting document data in the same output format on every page, such as an, account book.

Figure 2:
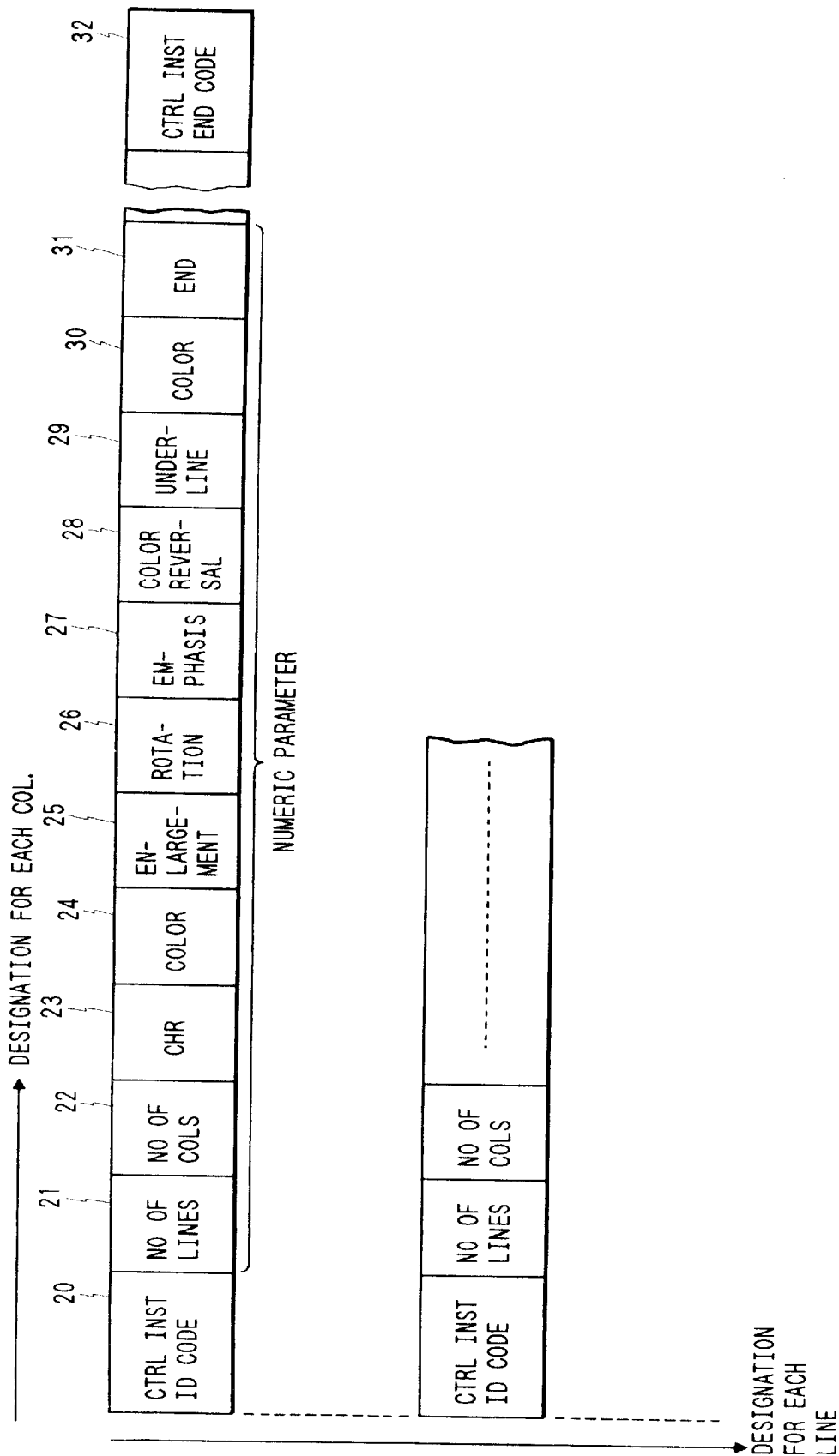
FIG. 2 is a diagram showing a format of control information regarding formation of a page according to the embodiment.

FIG. 2 shows an example of a data format according to output format.

The data in the output format in this embodiment is sent on a line unit basis.

That is, an output format for at least a target line is determined by parameters which are sandwiched by a control instruction ID code 20 and a control instruction end code 32 shown in the diagram.

The parameters will now be described in detail.

A size (and a position) of an area which was counted by using an arrangement position of a character as a reference are expressed by the number of lines 21 and the number of columns 22 shown in FIG. 2. For instance, assuming that the number of lines 21 is set to "5" and the number of columns 22 is set to "10", a rectangular area corresponding to five lines away from the target position in the vertical (line) direction and ten characters away from the target position in the lateral (column) direction is set. On the other hand, assuming that the number of lines is set to "1" and the number of columns is set to "5", a character train of five characters in the lateral direction is specified. In the opposite case, that is, assuming that the number of lines is set to "5" and the number of columns is set to "1", a character train of five characters in the vertical direction is specified. Namely, the target position is set to the character position at the left upper corner of the rectangular area which is designated. Therefore, when explaining the parameters shown in FIG. 2 as an example, since the number of lines 21 and the number of columns 22 are arranged just after the control instruction ID code, the target position in the area shown by the number of lines 21 and the number of columns 22 corresponds to the head position of the line. Further, in the case where the control instruction ID code 20 relates to the beginning of one page, the target position in the area designated at that time is set to the first character of the head line of one page.

The setting of the parameters of each desired area is performed in the following manner. The target position is used as a reference and the parameters are set with respect to an area where the target position exists in the line in accordance with the order from the position of the first line and the first column. After completion of the setting of the first line, the parameters are set with regard to an area where the target position exists in accordance with the order from the position of the second line and the first column and such a setting operation is similarly subsequently executed with respect to the other areas.

The contents of the parameters in FIG. 2 are described below.

A character style (Gothic type, Ming type, etc.) in the area shown by the number of lines 21 and the number of columns 22 and a point number indicative of the size of character are stored in a using character 23. Information indicative of the color of a character in the set area (a character train is used in place of the area in the case where the number of columns is set to an arbitrary value and the number of lines is set to only one) is stored in a color designation 24. On the other hand, information indicating whether each character is enlarged or not (or enlargement factor) is stored in enlargement information 25. Information indicating by which angle a character is rotated (on a 90° unit basis) is stored in rotation information 26. Information indicating whether a character is emphasized or not (whether a character is emphasized by modifying the character to a bold character or blank character or the like and printed or not, or an emphasizing method) is stored in emphasis information 27. Information indicating whether dots of "1" and "0" constructing a character pattern are inverted or not is stored in color reversal information 28. Information indicating whether an underline is added to a character or not is stored in underline information 29. Color designation information 30 is different from the foregoing color designation information 24 and is used to designate the color of ruled line in the case where an underline exists or the like. An end code 31 indicates the end of setting of the output format for a special area (area shown by the number of lines 21 and the number of columns 22). Therefore, in the case of setting an output format for characters after the character designated by the number of columns 22 of the same line, the above numeric parameters are arranged after the end code 31.

It should be noted that since the output color is set for the area which is determined by characters shown by the number of lines 21 and the number of columns 22, the output color can be set for each character, each character train of a predetermined number of characters, or each area of the size existing in a plurality of lines, in the same format, by merely designating a desired area by the number of lines 21 and the number of columns 22. In a manner similar to the above, as will be understood from the format of FIG. 2, for instance, by setting the emphasis data into the emphasis information 27, the output color for the characters in the area which is specified by the number of lines 21 and the number of columns 22 is set to the color designated by the color designation information 24. In other words, the output color can also be also set will all attribute and modification information of a character.

On the other hand, returning to FIG. 1, if the I/O data analyzer 103 determines that the data regarding the output format has been received, the data is sequentially analyzed by the output control instruction analyzer 106 and sent to the page formation controller 107. The page formation controller 107 forms the page information to determine the output format and the information to determine the output color on the basis of the received data.

Figure 3A:
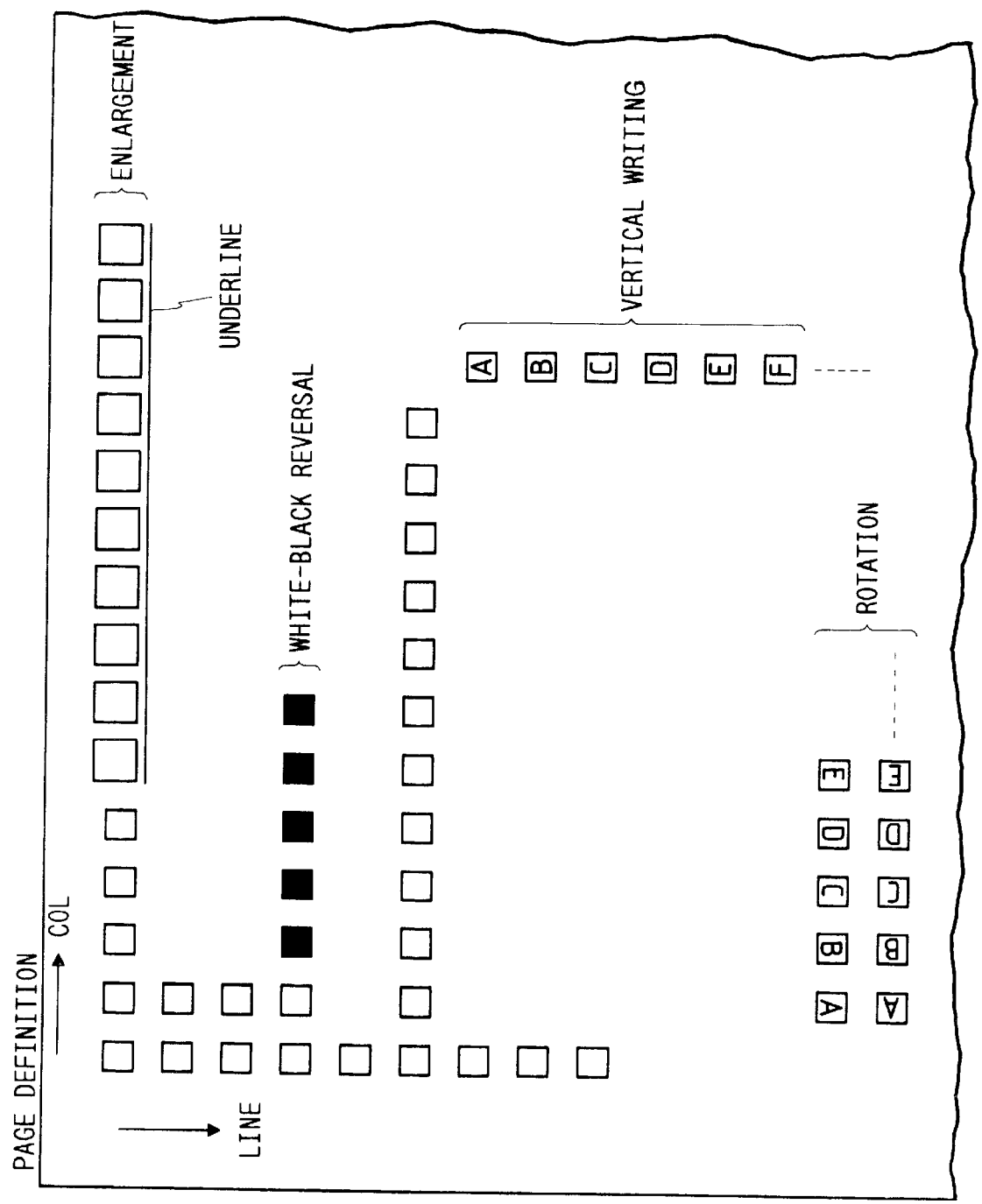
FIGS. 3A and 3B are diagrams showing the page information formed, respectively.
Figure 3B:
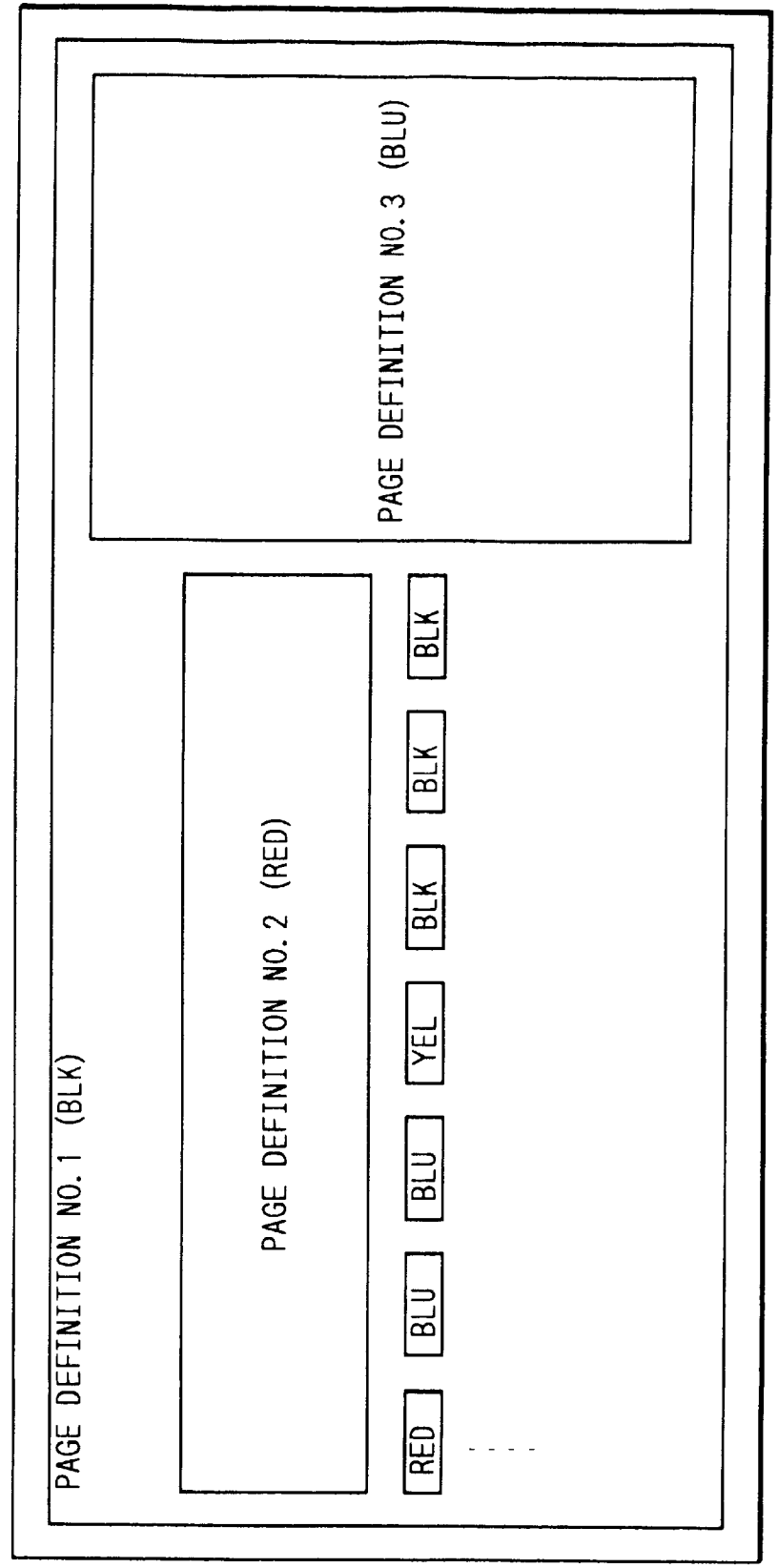

FIGS. 3A and 3B show examples of the page information formed in the embodiment.

FIG. 3A shows a layout of characters in a page excluding the output color and also shows the output format and is constructed by information indicating which character is an enlarged character or an underlined character, information indicating whether a black and white reversing process is executed or not, information indicating by which angle a character is rotated, and the like. On the other hand, FIG. 3B shows a distribution of output colors in a page and is constructed by information indicating which area is output by which color. The page information formed is stored into a memory provided in the page formation controller 107.

After the page information is formed as mentioned above, the character pattern based on the document data (stored in the data storage 104) comprising received character codes and the like is developed into the bit map memory 105 in accordance with the page information which has already been formed.

After the image of one page is developed into the bit map memory, the output color controller 109 sequentially reads the dots in the main scanning direction and outputs the read dots to the output controller 110 so that dots have the correct color in accordance with the color information of the corresponding position in the page information (FIG. 3B) of the output color in the page formation controller 107.

The output controller 110 receives the above data and drives and controls the output device controller 111, thereby executing a multicolor output.

In the case where the output device controller (engine section) 111 can only produce a visible image of a single color component at a certain time, namely, in the case of a document output device in which after a visible image of a single color component is formed, a visible image of another color component is multiplexed, it is sufficient to output only the image of a color to be produced at such a time to the output controller 110.

<Description of Processing Procedure (FIG. 4)>

FIG. 4 is a flowchart showing an outline of the processes described above. The operation will now be described in accordance with the flowchart. A program regarding the flowchart has been stored in a program memory in a CPU 113.

First, in step S201, when data is received through the I/O interface 102, the processing routine advances to step S202 and a check is made to see if the received data is a control instruction or document data such as a character code or the like. In the embodiment, since the mapping mode has been set, that is, since the control code regarding the output format of a page is first sent, the answer in step S202 is YES. In the next step S204, a check is made to see if the received instruction relates to data regarding the page formation. Since the page formation information is sent in this case, step S207 follows.

In step S207, the attributes (character pitch, output magnification, etc.) for each character are set. In step S208, the output color for the character train (which was designated) is set. In the next step S209, the output position of each character is set. In step S210, the output color of each character is also set. In step S211, data modification (whether the color reversing process is executed or not, whether a character is emphasized or not, whether a character is underlined or not, etc.) is set. In step S212, the output color for the data modification portion is set (the output color of the data modification portion is also similar to that in FIG. 3B). Each time the page formation control information is received, the processes in steps S207 to S212 are executed, thereby forming the page information as shown in FIGS. 3A and 3B.

After completion of the formation of the page information, document data to be actually output is then received. A few control codes to draw image data or a line segment such as a ruled line or the like are also included in the document data in addition to the character codes.

Therefore, in step S202, if it is determined that the received data is character code or the like instead of a control code, step S203 follows and the received data is stored into the data storage 104. On the other hand, if it is decided that the received data is a control code, an output control instruction analyzing process is executed in step S205, a character/figure generating process is executed in step S206, and after that, a process indicated by the control code is performed. For instance, if the control code indicates command data to draw a ruled line, the ruled line is developed into the bit map memory. The above processes are repeated until it is determined in step S213 that the document data of one page has been received.

If it is decided that the document data of one page has been received, the processing routine advances to step S214 and the process to develop the character pattern corresponding to the stored character code into the bit map memory is executed in accordance with the page information formed (steps S207 to S212). In step S215, while the output device is controlled, the data developed in the bit map memory is sequentially output in accordance with the output color information constructed as page information in step S216.

In the embodiment, the multicolor output is executed by a certain output control instruction in the document data. However, such instruction can be also input from the outside during the output of the document data and the multicolor output can be also executed.

On the other hand, the output color of the page data can be flexibly changed by changing the previously set output color or the previously defined output color by the controller of the multicolor document output device.

Although the embodiment has been described with respect to the mapping mode, the invention can be also applied to an APA (All Point Addressability) mode, that is, to the case where control instructions are actively inserted into the document data and the character set, output position, line pitch, character pitch, etc. are controlled and the data is printed.

As described above, according to the embodiment, by a simple data format, the output color can be also set every output color of a special line or column or every format (including both of the attributes and modification) of output character as well as every area.

As described above, according to the invention, the color in which to output a character is set for every area which uses an existing position of the character as a reference. Therefore, there is an advantage because the operation to match the input document data with the area in which the output color has been set and to output can be easily performed.

As described above, according to the invention, the color to output a character is set for every area which uses an existing position of the character as a reference. Therefore, there is an advantage because the output color(s) can be easily set for one or a plurality of number of desired characters.

As described above, according to the invention, both of the attributes of the character such as output magnification, pattern, and the like and the output color of the character can be set for every area which uses an existing position of the character as a reference. Therefore, there is an advantage such that the output color can also be easily set on a character unit basis in accordance with the attributes of the character.

As described above, according to the invention, both of the character modification information such as underline, rotation, emphasis character, etc. and the color of the character modification can be set for every area which uses an existing position of the character as a reference. Therefore, there is an advantage because the output color can be easily set on a character unit basis in correspondence to the character modification and, further, the color of the character modification can also be easily set on a character unit basis.

I claim:

1. A printing control apparatus which receives information from an external apparatus and controls a printing apparatus to output a pattern in a designated color on the basis of the received information, said printing control apparatus comprising:

reception means for receiving from the external apparatus character information designating a character, area information designating an area as to printing, character color information designating a color for the area designated by the area information, and modification color information designating a color for a modification pattern used for a character within the area designated by the area information;

generation means for generating a character pattern on the basis of the character information received by said reception means and generating a modification pattern for modifying the character pattern; and control means for controlling the printing apparatus to output the character pattern and the modification pattern generated by said generation means in the colors designated by the character color information and by the modification color information received by said reception means, respectively, if the character pattern and the modification pattern are to be output at a location within the area designated by the area information received by said reception means.

2. A printing control apparatus according to claim 1, wherein the area information designates the area by a number of lines and a number of columns.

3. A printing control apparatus according to claim 1, wherein the character information designates the character by a character code.

4. A printing control apparatus according to claim 1, further comprising the printing apparatus which prints the character pattern and the modification pattern as controlled by said control means.

5. A method of operating a printing control apparatus which receives information from an external apparatus and controls a printing apparatus to output a pattern in a designated color on the basis of the received information, comprising:

a reception step of receiving from the external apparatus character information designating a character, area information designating an area as to printing, character color information designating a color for the area designated by the area information, and modification color information designating a color for a modification pattern used for a character within the area designated by the area information;

a generation step of generating a character pattern on the basis of the character information received by said reception step and generating a modification pattern for modifying the character pattern; and a control step of controlling the printing apparatus to output the character pattern and the modification pattern generated by said generation step in the colors designated by the character color information and by the modification color information received by said reception step, respectively, if the character pattern and the modification pattern are to be output at a location within the area designated by the area information received by said reception step.

6. A method of operating printing control apparatus according to claim 5, wherein the area information designates the area by a number of lines and a number of columns.

7. A method of operating a printing control apparatus according to claim 5, wherein the character area information designates the character by a character code.

8. A method of operating a printing control apparatus according to claim 5, further comprising a printing step of printing the character pattern and the modification pattern as controlled by said control step.

9. A memory medium having readable program code means for causing a printing control apparatus which receives information from an external apparatus and controls a printing apparatus to output a pattern in a designated color on the basis of the received information, said memory medium comprising:

first means for causing reception means to receive from the external apparatus character information designating a character, area information designating an area as to printing, character color information designating a color for the area designated by the area information, and modification color information designating a color for a modification pattern used for a character within the area designated by the area information;

second means for causing generation means to generate a character pattern on the basis of the character information received by said reception means and generating a modification pattern for modifying the character pattern; and third means for causing control means to control the printing apparatus to output the character pattern and the modification pattern generated by said generation means in the colors designated by the character color information and by the modification color information received by said reception means, respectively, if the character pattern and the modification pattern are to be output at a location within the area designated by the area information received by said reception means.

10. A memory medium according to claim 9, wherein the area information designates the area by a number of lines and a number of columns.

11. A memory medium according to claim 9, wherein the character information designates the character by a character code.

12. A memory medium according to claim 9, further comprising the printing apparatus which prints the character pattern and the modification pattern as controlled by said control means.

* * * * *

UNITED STATES PATENT AND TRADEMARK OFFICE
CERTIFICATE OF CORRECTION

PATENT NO. : 5,878,194

DATED : March 2, 1999

INVENTOR(S) : HIROSHI KOGA

It is certified that error appears in the above-identified patent and that said Letters Patent is hereby corrected as shown below:

COLUMN 2 line 23, "anlayzing" should read --analyzing--;
   line 27, "cotroller" should read --controller--;
   line 53, "defines" should read --define--; and
   line 60, "an," should read --an--.

COLUMN 4 line 22, "be also" should read --be-- and
          "will" should read --with--.

UNITED STATES PATENT AND TRADEMARK OFFICE
CERTIFICATE OF CORRECTION

PATENT NO.    : 5,878,194

DATED         : March 2, 1999

INVENTOR(S)   : HIROSHI KOGA

It is certified that error appears in the above-identified patent and that said Letters Patent is hereby corrected as shown below:

<u>COLUMN 6</u> line 38, "of" should be deleted.

Signed and Sealed this

Eleventh Day of April, 2000

*Attest:*

Q. TODD DICKINSON

*Attesting Officer*     *Director of Patents and Trademarks*